(12) United States Patent
Zhang et al.

(10) Patent No.: US 11,661,282 B2
(45) Date of Patent: May 30, 2023

(54) SPHERICAL OBJECT FALLING BUFFER DEVICE

(71) Applicant: TSINGHUA UNIVERSITY, Beijing (CN)

(72) Inventors: Haiquan Zhang, Beijing (CN); Junfeng Nie, Beijing (CN); Xin Wang, Beijing (CN); Hongke Li, Beijing (CN); Zuoyi Zhang, Beijing (CN); Yujie Dong, Beijing (CN)

(73) Assignee: TSINGHUA UNIVERSITY, Beijing (CN)

( * ) Notice: Subject to any disclaimer, the term of this patent is extended or adjusted under 35 U.S.C. 154(b) by 364 days.

(21) Appl. No.: 17/254,203

(22) PCT Filed: Nov. 27, 2019

(86) PCT No.: PCT/CN2019/121188
§ 371 (c)(1),
(2) Date: Dec. 18, 2020

(87) PCT Pub. No.: WO2020/134808
PCT Pub. Date: Jul. 2, 2020

(65) Prior Publication Data
US 2021/0261341 A1      Aug. 26, 2021

(30) Foreign Application Priority Data

Dec. 29, 2018   (CN) .......................... 201811639037.3

(51) Int. Cl.
*B65G 11/20*       (2006.01)
*B65G 65/32*       (2006.01)
(Continued)

(52) U.S. Cl.
CPC ............ *B65G 11/203* (2013.01); *B65G 65/32* (2013.01); *B65G 69/16* (2013.01); *G21C 19/202* (2013.01); *B65G 2201/0214* (2013.01)

(58) Field of Classification Search
CPC .... B65G 11/063; B65G 11/203; B65G 65/32; B65G 69/16; B65G 2201/0214; G21C 1/07; G21C 19/202
See application file for complete search history.

(56) References Cited

U.S. PATENT DOCUMENTS 3,253,738 A * 5/1966 Bromley .............. G21C 19/202
                                                            221/265
4,079,830 A     3/1978 Winberg
(Continued)

FOREIGN PATENT DOCUMENTS

CN        101777397 A      7/2010
CN        101794632 A      8/2010
(Continued)

OTHER PUBLICATIONS

CN Search Report in Application No. 201811639037.3 dated Dec. 29, 2018.

*Primary Examiner* — Gene O Crawford
*Assistant Examiner* — Keith R Campbell
(74) *Attorney, Agent, or Firm* — Maschoff Brennan (57) ABSTRACT

The present application relates to a spherical object falling buffer device including a flow-limiting pipe assembly and a central column assembly; wherein the flow-limiting pipe assembly includes a flow-limiting pipe, a redirecting joint and a sphere outlet pipe; a diameter of the flow-limiting pipe is greater than that of the sphere outlet pipe, and an inner surface of the redirecting joint is a conical surface; the central column assembly includes at least a central column arranged in the flow-limiting pipe; a flow-guiding region is provided between the flow-limiting pipe and the central (Continued)

column, and a plurality of gravity flow guide grooves are provided on an outer peripheral surface of the central column. The spherical object falling buffer device may restrict, guide and buffer spherical objects during falling, and avoids collision damage of the spherical objects or the stock bin due to the excessive falling speed of the spherical objects.

10 Claims, 8 Drawing Sheets (51) Int. Cl.
*B65G 69/16* (2006.01)
*G21C 19/20* (2006.01)

(56) References Cited

U.S. PATENT DOCUMENTS

| 4,332,120 | A | * | 6/1982 | Haynes | G21C 21/00 |
|---|---|---|---|---|---|
| | | | | | 976/DIG. 282 |
| 4,654,189 | A | | 3/1987 | Schoening et al. | |
| 5,048,666 | A | * | 9/1991 | Huggins, Sr. | B65G 69/16 |
| | | | | | 198/534 |
| 7,753,086 | B2 | * | 7/2010 | Dessen | B65G 69/16 |
| | | | | | 422/219 |
| 9,669,372 | B2 | | 6/2017 | Stander et al. | |
| 2008/0149215 | A1 | | 6/2008 | Patureaux et al. | |
| 2013/0299312 | A1 | | 11/2013 | Polleres | |

FOREIGN PATENT DOCUMENTS

| CN | 101853708 A | 10/2010 | | |
|---|---|---|---|---|
| CN | 103329170 A | 9/2013 | | |
| CN | 204096442 U | 1/2015 | | |
| CN | 105905517 A | 8/2016 | | |
| CN | 206351943 U | 7/2017 | | |
| CN | 108695004 A | 10/2018 | | |
| CN | 109607034 A | 4/2019 | | |
| DE | 19941991 A1 * | 3/2001 | | G21C 1/07 |
| EP | 1939115 A2 | 7/2008 | | |
| JP | 5345315 B2 | 8/2013 | | |

* cited by examiner

SPHERICAL OBJECT FALLING BUFFER DEVICE

CROSS-REFERENCE

The present application claims priority to Chinese Patent Application No. 2018116390373, filed on Dec. 29, 2018, entitled "Spherical Object Falling Buffer Device", which is incorporated herein by reference in its entirety.

FIELD OF TECHNOLOGY

The present application relates to the field of engineering technologies, and particularly to a spherical object falling buffer device.

BACKGROUND

A pebble bed high temperature gas-cooled reactor achieves an on-load continuous operation by using spherical objects to pass through the core multiple times. The used spherical objects have diameters of 60 mm, and the graphite with high strength, high density and high purity is used as a matrix. The design requirement of a pebble bed high temperature gas-cooled reactor is that a single spherical object can be dropped from a height of 4 m to the pebble bed 50 times in a free falling manner without damage. Once the spherical object is damaged, it will seriously affect the operational stability of the fuel loading and unloading system, as well as the operational reliability of the moving equipment parts in the spherical path.

SUMMARY

(I) Technical Problem to be Solved

An objective of the present application is to provide a spherical object falling buffer device capable of protecting the spherical objects and a stock bin entity well.

(II) Technical Solutions

In order to solve the technical problem above, the present application provides a spherical object falling buffer device, including a flow-limiting pipe assembly and a central column assembly; wherein the flow-limiting pipe assembly includes a flow-limiting pipe, a redirecting joint and a sphere outlet pipe that are connected in sequence from top to bottom; a diameter of the flow-limiting pipe is greater than that of the sphere outlet pipe, and an inner surface of the redirecting joint is a conical surface; the central column assembly comprises at least a central column arranged in the flow-limiting pipe; a flow-guiding region is provided between the flow-limiting pipe and the central column, and several gravity flow guide grooves are provided on an outer peripheral surface of the central column.

Specifically, the gravity flow guide grooves are spiral guide grooves arranged on the outer peripheral surface of the central column.

Further, the central column includes a connecting column and a connecting rod that arranged in sequence from top to bottom; the connecting column is arranged in the flow-limiting pipe; a bottom of the connecting rod passes through the redirecting joint and is arranged in the sphere outlet pipe; the connecting column is detachably connected to the connecting rod.

Further, the central column further includes a sphere outlet rod connected to the connecting rod, and a bottom of the sphere outlet rod is provided with a redirecting end.

Specifically, the gravity flow guide grooves are vertical guide grooves; the central column is provided with a plurality of guide groove edges extending vertically, and the plurality of guide groove edges are annularly arranged on the outer peripheral surface of the central column, and one vertical guide groove is formed between two adjacent guide groove edges.

Specifically, the redirecting end includes inner inclined surfaces provided in each of the vertical guide grooves respectively and an external tapered surface provided on the outside of the sphere outlet rod; the external tapered surface and the vertical guide grooves are connected through the inner inclined surface in a smooth transition manner.

Specifically, a first convex rib or a concave groove is provided on the inner surface of the redirecting joint.

Specifically, second convex ribs of which the number is equal to that of the guide groove edges are provided on the inner surface of the redirecting joint, and each second convex rib corresponds one-to-one to each guide groove edge.

Further, the spherical object falling buffer device further includes a sphere inlet pipe assembly connected to an upper portion of the flow-limiting pipe; wherein the sphere inlet pipe assembly includes several feed pipes, and sphere inlet holes of which the number is equal to that of the feed pipes are provided on the flow-limiting pipe; the sphere inlet holes are connected to the flow-guiding region; and each of the feed pipes is respectively connected to each of the sphere inlet holes in a one-to-one correspondence through feed pipe orifice.

In addition, the central column assembly further includes a central column support connected to the top of the central column; wherein the central column support is connected to the flow-limiting pipe, and a shielding assembly is provided at the top of the flow-limiting pipe.

(III) Advantageous Effects

The technical solutions above of the present application have the following merits:

In the spherical object falling buffer device provided by the present application, a central column assembly is provided in the flow-limiting pipe assembly, so that a flow-guiding region is formed between the flow-limiting pipe and the central column. By arranging a plurality of gravity flow guide grooves on the outer peripheral surface of the central column, the spherical objects can only move in the flow-guiding region between the flow-limiting pipe and the central column, and are restricted and guided by the gravity flow guide grooves during falling, and the spherical objects will be further buffered by the conical surface when they fall to the redirecting joint, so that the spherical objects will not directly fall from the center of the flow-limiting pipe into the stock bin regardless of the initial velocity of the spherical objects, thereby avoiding the collision damage of the spherical objects or the stock bin due to the excessive high falling speed of the spherical objects. The spherical object falling buffer device has a good protective effect on the spherical objects and the stock bin entity, and has simple structure as well as convenient installation, which can meet the reliability requirement of buffer loading of the spherical objects under various working conditions.

| 1 | spherical object | 2 | shielding assembly; |
|---|---|---|---|
| 10 | central column assembly | 11 | central column support |
| 12 | central column | 13 | flow-guiding region |
| 14 | outer cylindrical surface | 15 | spiral guide plate |
| 16 | space over redirecting joint | 17 | second convex rib |
| 20 | flow-limiting pipe assembly | 21 | flow-limiting pipe |
| 22 | redirecting join | 23 | sphere outlet pipe |
| 24 | sphere inlet hole | | |
| 25 | inner cylindrical surface of flow-limiting pipe | | |
| 26 | bearing | 27 | conical surface |
| 28 | concave groove | 29 | first convex rib |
| 30 | feed pipe assembly | 31 | feed pipe |
| 32 | feed pipe orifice | 40 | connecting column |
| 41 | connecting rod | 42 | sphere outlet rod |
| 43 | redirecting end | 44 | vertical guide groove |
| 45 | connecting end | 46 | straight edge section |
| 47 | guide groove edge | 48 | inner inclined surface |
| 49 | external tapered surface | 50 | sphere outlet pipe gap |
| 51 | sphere falling region | | |

DETAILED DESCRIPTION

In order to make the objectives, technical solutions, and advantages of the embodiments of the present application clearer, the technical solutions of the embodiments of the present application will be clearly and completely described with reference to the accompanying drawings of the embodiments of the present application. Obviously, the described embodiments are part but not all of the embodiments of the present application. Based on the embodiments of the present application, all other embodiments obtained by a person of ordinary skill in the art without creative efforts shall fall within the protection scope of the present application.

As shown in FIG. 1 to FIG. 9, the embodiments of the present application provide a spherical object falling buffer device, including a central column assembly 10, a flow-limiting pipe assembly 20 and a sphere inlet pipe assembly 30. The central column assembly 10 is arranged in the flow-limiting pipe assembly 20, and the sphere inlet pipe assembly 30 is connected with the flow-limiting pipe assembly 20.

Figure 1:
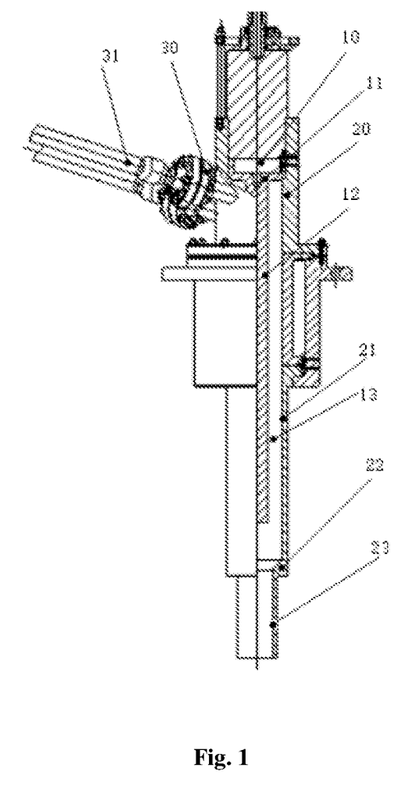
FIG. 1 is a structural schematic diagram of the spherical object falling buffer device according to an embodiment of the present application.
Figure 2:
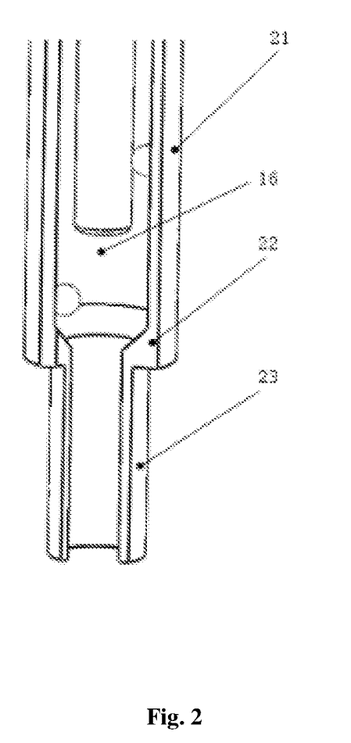
FIG. 2 is a structural schematic diagram of the flow-limiting pipe assembly in the spherical object falling buffer device according to an embodiment of the present application.

The flow-limiting pipe assembly 20 includes a flow-limiting pipe 21, a redirecting joint 22 and a sphere outlet pipe 23 that are connected in an order from top to bottom. A diameter of the flow-limiting pipe 21 is greater than that of the sphere outlet pipe, and an inner surface of the redirecting joint 22 is a conical surface 27.

Figure 3:
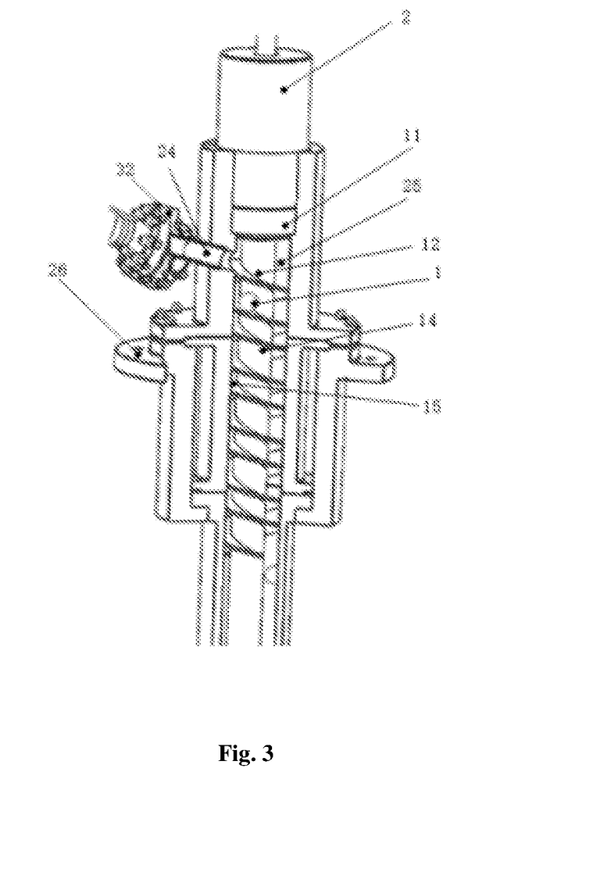
FIG. 3 is a structural schematic diagram of the central column assembly in the spherical object falling buffer device according to an embodiment of the present application.

The central column assembly 10 includes a central column 12 arranged in the flow-limiting pipe 21. A flow-guiding region 13 is provided between the flow-limiting pipe 21 and the central column 12, and several gravity flow guide grooves are provided on an outer peripheral surface of the central column 12.

The sphere inlet pipe assembly 30 is connected to an upper portion of the flow-limiting pipe 21. The sphere inlet pipe assembly 30 includes several feed pipes 31, and sphere inlet holes 24 of which the number is equal to that of the feed pipes 31 are provided on the flow-limiting pipe 21. The sphere inlet holes 24 are connected to the flow-guiding region 13. Each of the feed pipes 31 is connected to each of the sphere inlet holes 24 in a one-to-one correspondence respectively through feed pipe orifices 32. While a number of the provided sphere inlet hole 24 is equal to that of the gravity flow guide grooves, and each of the sphere inlet holes 24 is in a one-to-one correspondence to each of the gravity flow guide grooves respectively.

The central column assembly 10 further includes a central column support 11 connected with the top of the central column 12. The central column support 11 is connected with the flow-limiting pipe 21, and a shielding assembly 2 is further provided at the top of the flow-limiting pipe 21. The shielding assembly 2 is configured to shield the core neutron, so as to compensate the shielding of the core fuel element neutron by the flow-guiding region 13. A bearing 26 is further provided on the outside of the flow-limiting pipe 21. The spherical object falling buffer device of the present application is mounted at a center of a support plate of a metal member in the reactor through the support 26.

In an embodiment of the present application, after the spherical object 1 is introduced into the flow-guiding region 13 from the feed pipe 31, it spirally falls along an inner wall of the flow-limiting pipe 21 under the action of motion inertia and gravity, then reaches the conical surface 27 of the redirecting joint 22, and then continues rotating and finally falls into a stock bin from the sphere outlet pipe 23 under the action of friction and gravity. If the initial speed is too small, the spherical object 1 may fall quickly from the flow-guiding region 13 to the conical surface 27 of the redirecting joint 22, and part of its momentum is converted into impulse after being rebounded, and falls from the sphere outlet pipe 23 into the stock bin after its speed is slowed.

In a specific embodiment of the present application, the gravity flow guide grooves are spiral guide grooves annularly arranged on the outer peripheral surface of the central column. That is, spiral guide plates 15 are arranged on an outer cylindrical surface 14 of the central column 12 so as to form the spiral guide grooves.

In the present embodiment, the sphere inlet pipe assembly 30 is provided with two feed pipes 31, therefore two spiral guide plates 15 are provided on the central column 12 correspondingly to the two feed pipes 31. By the guidance of the spiral guide plates 15, the spherical object 1 spirally falls along an inner wall surface 25 of the flow-limiting pipe 21 or spirally falls along the spiral guide grooves on the central column 12 after it enters the flow-guiding region 13 from the sphere inlet hole 24. Due to the support and friction effect of the spiral guide plates 15, the spiral falling speed of the spherical object 1 is reduced relative to a smooth pipe. After the spherical object 1 leaves the central column 12 and enters a space over redirecting joint 16, it is easier to fall onto the conical surface 27 of the redirecting joint 22 below, then the spherical object 1 falls via the sphere outlet pipe 23 after rotating, or falls via the sphere outlet pipe 23 after being rebounded, or directly falls through the sphere outlet pipe 23.

A first convex rib or a concave groove is provided on the inner surface of the redirecting joint.

In a specific embodiment of the present application, when a plurality of sphere inlet holes 24 are provided on the flow-limiting pipe 21, a distance between the bottom end of the central column 12 and the conical surface 27 of the redirecting joint 22 should be greater than two times the diameter of the spherical object 1, so as to avoid that after a plurality of spherical objects 1 arrive at the space over redirecting joint 16 simultaneously, the movement between the spherical objects 1 affects each other, or a bridge is formed in the extreme case, and the spherical object 1 is rebounded from the redirecting joint 22 to hit the central column 12.

Figure 4:
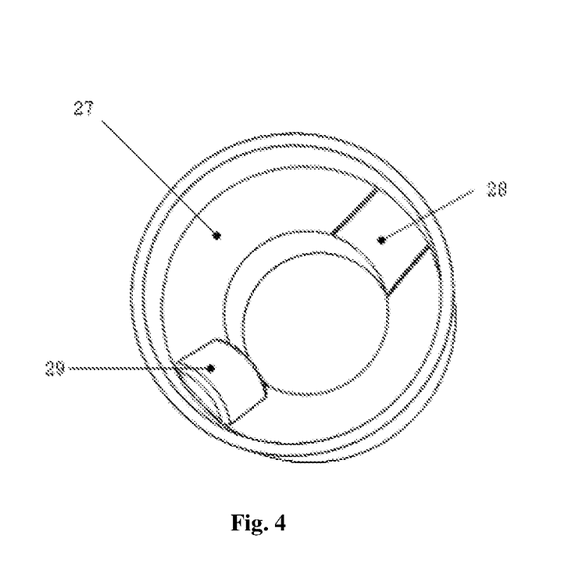
FIG. 4 is a diagram illustrating the redirecting joint in the spherical object falling buffer device according to an embodiment of the present application.
Figure 5:
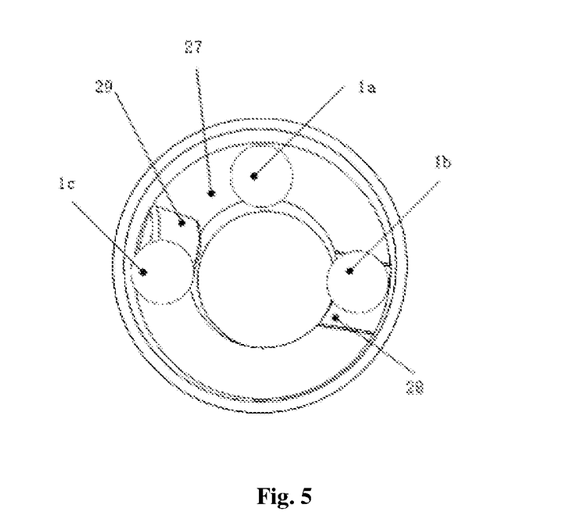
FIG. 5 is a diagram illustrating a cooperation state of the redirecting joint in the spherical object falling buffer device and the spherical objects according to an embodiment of the present application.

In a specific embodiment of the present application, in order to avoid that the spherical objects 1 rotate on the conical surface 27 for a long time and do not fall, are over-rebounded or form a bridge, etc., a first convex rib 29 can be provided on the conical surface 27 of the redirecting joint 22, and a concave groove 28 can also be provided on the conical surface 27 of the redirecting joint 22, or the first convex rib 29 and the concave groove 28 can be provided on the conical surface 27 of the redirecting joint 22 at the same time. By providing the first convex rib 29 and/or the concave groove 28, movement disturbance and buffering can be applied to the spherical objects 1. Compared with the spherical object 1a moving steadily on the conical surface 27, the spherical object 1b can sink into the concave groove 28, or when the spherical object 1c moves up and fall on the first convex rib 29, both the movement track and the speed of the spherical object are abruptly changed due to interference or obstacles, resulting in imbalanced movement and quickly leaving the conical surface 27, and finally falling via the sphere outlet pipe 23.

Figure 6:
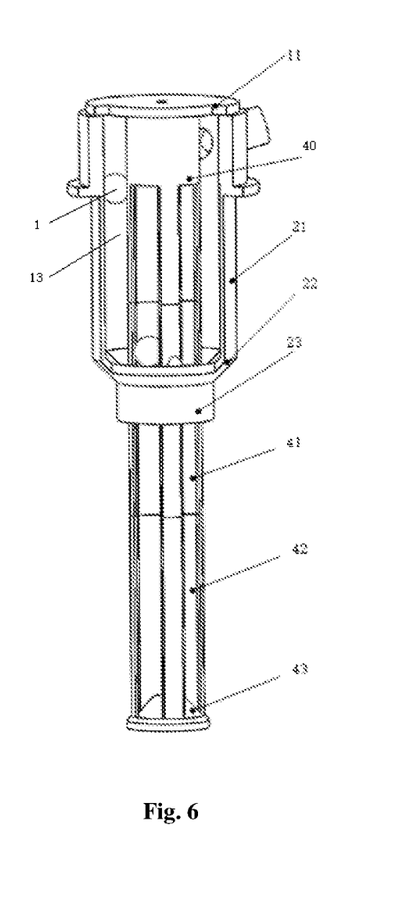
FIG. 6 is another structural schematic diagram of the central column assembly in the spherical object falling buffer device according to an embodiment of the present application.

In a specific embodiment of the present application, the bottom of the central column 12 passes through the redirecting joint 22 and the sphere outlet pipe 23 in sequence. The sphere outlet pipe 23 is disposed outside the central column 12. A sphere outlet pipe gap 50 between the sphere outlet pipe 23 and the central column is insufficient to let the spherical object 1 pass through. At this time, vertical guide grooves 44 are used as the gravity flow guide grooves. That is, the central column 12 is provided with a plurality of guide groove edges 47 extending vertically. The plurality of guide groove edges 47 are annularly arranged on the outer peripheral surface of the central column 12, one vertical guide groove 44 is formed between two adjacent guide groove edges 47, and the spherical object 1 can finally fall through the vertical guide groove 44.

Figure 9:
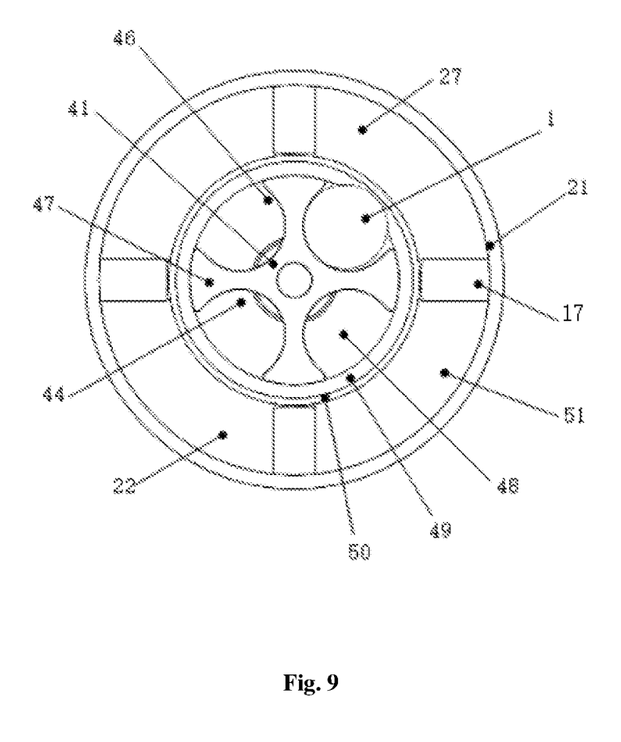
FIG. 9 is a top view of the redirecting joint in the spherical object falling buffer device according to an embodiment of the present application.

In a specific embodiment of the present application, second convex ribs 17 of which the number is equal to that of the guide groove edges 47 are provided on the conical surface 27 of the redirecting joint 22, and each second convex rib 17 corresponds one-to-one to each guide groove edge 47 respectively, so that one sphere falling region 51 is formed between two adjacent second convex ribs 17, and each sphere falling region 51 corresponds one-to-one to each vertical guide groove 44. The spherical object 1 enters the flow-guiding region 13 from the feed pipe orifice 32, spirally falls along the flow-guiding region 13, and then reaches the conical surface 27 of the redirecting joint 22 and continues to move. At this time, affected by the obstacle of the second convex rib 17, the spherical object 1 finally enters the vertical guide groove 44 from the sphere falling region 51, and continues to fall downward along the vertical guide groove 44.

In a specific embodiment of the present application, the vertical guide groove 44 includes a semi-circular arc groove section that is slightly larger than the spherical object 1, and two straight edge sections 46 correspondingly tangent to both sides of the semi-circular arc groove section, respectively. As long as the sphere outlet pipe 23 meets a certain length requirement, the spherical object 1 can be guided to fall in the vertical guide groove 44 due to the restriction of the sphere outlet pipe 23 and the vertical guide groove 44.

Figure 7:
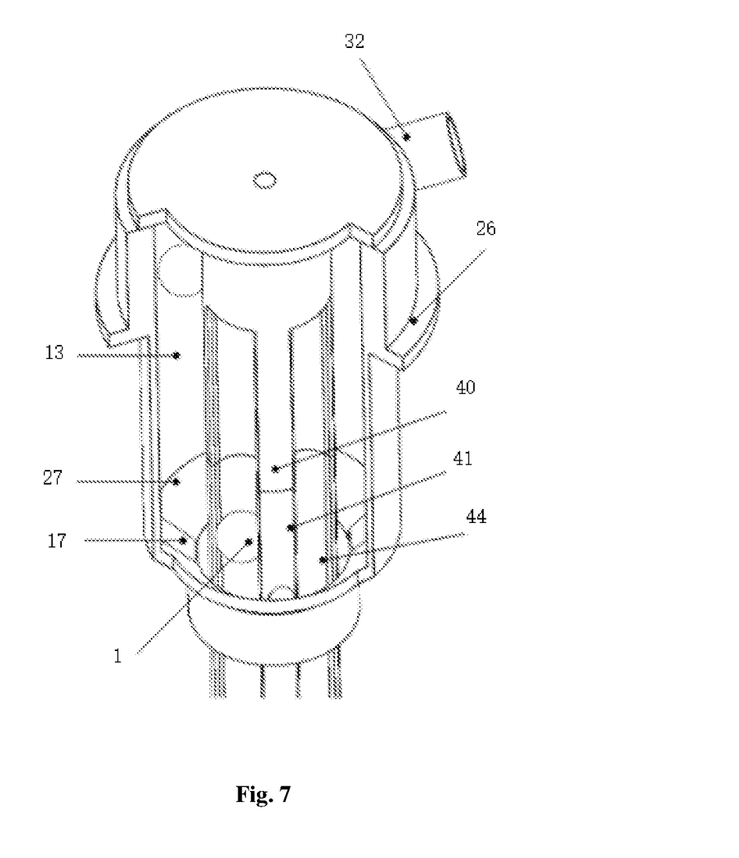
FIG. 7 is a structural schematic diagram of the connecting column and the connecting rod in the spherical object falling buffer device according to an embodiment of the present application.

In a specific embodiment of the present application, the central column includes a connecting column 40 and a connecting rod 41 that arranged in sequence from top to bottom. The connecting column 40 is detachably connected to the connecting rod 41. In this embodiment, the connecting column 40 is arranged in the flow-limiting pipe 21, and a bottom of the connecting rod 41 passes through the redirecting joint 22 and arranged in the sphere outlet pipe 23. According to the height requirement of the feed region, a plurality of sections of the connecting rod 41 may be provided, and then the plurality of sections of the connecting rod 41 are sequentially connected to the bottom of the connecting column 40.

Figure 8:
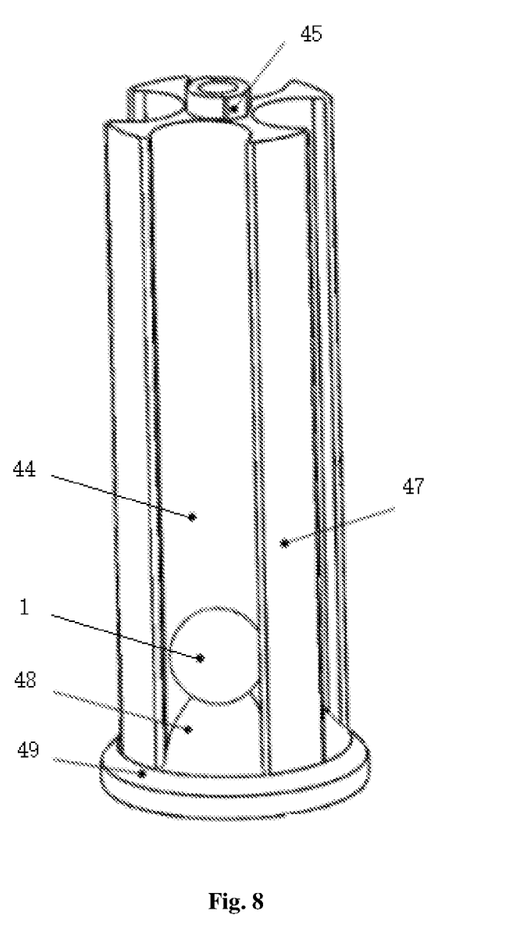
FIG. 8 is a structural schematic diagram of the sphere outlet rod in the spherical object falling buffer device according to an embodiment of the present application.

In a specific embodiment of the present application, when the distance from an exit of the redirecting joint 22 to an exit of the vertical guide groove 44 on the central column is large, in order to limit the speed at which the spherical object 1 reaches the exit, the central column 12 includes a connecting column 40, a connecting rod 41 and a sphere outlet rod 42 that are connected in sequence from top to bottom. In this embodiment, a bottom of the sphere outlet rod 42 is provided with a redirecting end 43, and the sphere outlet rod 42 is detachably connected to the connecting rod 41 through a connecting end. The redirecting end 43 includes inner inclined surfaces 48 provided in the respective vertical guide grooves 44 respectively and an external tapered surface 49 provided on the outside of the sphere outlet rod 42. A smooth transition occurs between the vertical guide groove 44 and the external tapered surface 49 through the inner inclined surface 48. When the spherical object 1 accelerates to fall along the vertical guide groove 44 and reaches the inner inclined surface 48, it collides with the inner inclined surface 48, and part of the momentum is converted into impulse to buffer and decelerate, and the spherical object 1 falls into the stock bin under the guide of the inner inclined surface 48 and the external tapered surface 49.

In each of the embodiments above, spiral guide grooves are used as the gravity flow guide grooves, which are more suitable for cyclic loading and unloading where the material level is kept relatively constant, such as the core cyclic loading of a pebble bed reactor during normal operation.

While the vertical guide grooves 44 are used as the gravity flow guide grooves, and the central column is arranged to include the connecting column 40, the connecting rod 41 and the sphere outlet rod 42 that are detachably connected in sequence, it is more suitable for continuous loading with varying material levels, such as the initial core loading of the pebble bed reactor. As the material level rises to a certain height, the connecting rod 41 or sphere outlet rod 42 can be disassembled to achieve telescopic loading. In the case that the strength and rigidity are sufficient, as long as the flow of the spherical objects in the stock bin is not adversely affected, the connecting rod 41 and the sphere outlet rod 42 may not be disassembled and may be the fixed central column assembly in the stock bin. As the material level ascends continuously, the sphere outlet rod 42 and the connecting rod 41 are successively buried.

In summary, in the spherical object falling buffer device according to the embodiments of the present application, a central column assembly is provided in the flow-limiting pipe assembly, so that a flow-guiding region is formed between the flow-limiting pipe and the central column. By arranging a plurality of gravity flow guide grooves on the outer peripheral surface of the central column, the spherical objects can only move in the flow-guiding regions between the flow-limiting pipes and the central column, and are restricted and guided by the gravity flow guide grooves during falling, and the spherical objects will be further buffered by the conical surface when they fall to the redirecting joint, so that the spherical objects will not directly fall into the stock bin from the center of the flow-limiting pipe regardless of the initial velocity of the spherical objects, thereby avoiding the collision damage of the spherical objects or the stock bin due to the excessive falling speed of the spherical objects. The spherical object falling buffer device has a good protective effect on the spherical objects and the stock bin entity, and has simple structure as well as convenient installation, which can meet the reliability requirement of buffer loading of the spherical objects under various working conditions.

In the description of the present application, it should be noted that, the terms "connected with" and "connected to" should be understood in a broad sense unless otherwise specified and limited, for example, they may be fixed connections, detachable connections, or integrated connections; they can be mechanical connections or electrical connections; they can be direct connections or indirect connections through intermediate mediums. For those of ordinary skill in the art, the specific meanings of the above terms in this application can be understood according to specific situations.

In the description of the present application, unless otherwise stated, "several" means one or more; "multiple" means two or more. The orientation or position relations indicated by the terms "upper", "lower", "left", "right", "inner", "outer" and etc. are based on the orientation or position relations shown in the drawings, and are only for the convenience of describing the present application and simplifying the description, rather than indicating or implying that the referred device or element must have a specific orientation, be constructed and operated in a specific orientation, and therefore cannot be understood as limiting the present application.

Finally, it should be noted that the embodiments above are only used to illustrate rather than limit the technical solutions of the present application. Although the present application has been described in detail with reference to the foregoing embodiments, those of ordinary skill in the art should understand that they can still modify the technical solutions described in the various embodiments above, or equivalently replace some of the technical features thereof; and these modifications or replacements do not depart from the essence of the corresponding solutions from the spirit and scope of the technical solutions of the various embodiments of the present application.

The invention claimed is:

1. A spherical object falling buffer device, comprising a flow-limiting pipe assembly and a central column assembly; wherein the flow-limiting pipe assembly comprises a flow-limiting pipe, a redirecting joint and a sphere outlet pipe that are connected in sequence from top to bottom; a diameter of the flow-limiting pipe is greater than that of the sphere outlet pipe, and an inner surface of the redirecting joint is a conical surface; the central column assembly comprises at least a central column arranged in the flow-limiting pipe; a flow-guiding region is provided between the flow-limiting pipe and the central column, and several gravity flow guide grooves are provided on an outer peripheral surface of the central column.

2. The spherical object falling buffer device of claim 1, wherein the gravity flow guide grooves are spiral guide grooves annularly arranged on the outer peripheral surface of the central column.

3. The spherical object falling buffer device of claim 1, wherein the central column comprises a connecting column and a connecting rod that arranged in sequence from top to bottom; the connecting column is arranged in the flow-limiting pipe; a bottom of the connecting rod passes through the redirecting joint and is arranged in the sphere outlet pipe; the connecting column is detachably connected to the connecting rod.

4. The spherical object falling buffer device of claim 3, wherein the central column further comprises a sphere outlet rod connected to the connecting rod, and a bottom of the sphere outlet rod is provided with a redirecting end.

5. The spherical object falling buffer device of claim 4, wherein the gravity flow guide grooves are vertical guide grooves; the central column is provided with a plurality of guide groove edges extending vertically, the plurality of guide groove edges are annularly arranged on the outer peripheral surface of the central column, and one of the vertical guide grooves is formed between two adjacent guide groove edges of the plurality of guide groove edges.

6. The spherical object falling buffer device of claim 5, wherein the redirecting end comprises inner inclined surfaces provided in the respective vertical guide grooves respectively and an external tapered surface provided on the outside of the sphere outlet rod; the external tapered surface and the vertical guide groove are connected through the inner inclined surface.

7. The spherical object falling buffer device of claim 2, wherein a first convex rib or a concave groove is provided on the inner surface of the redirecting joint.

8. The spherical object falling buffer device of claim 5, wherein second convex ribs of which the number is equal to that of the guide groove edges are provided on the inner surface of the redirecting joint, and each of the second convex ribs corresponds one-to-one to each of the guide groove edge.

9. The spherical object falling buffer device of claim 1, further comprising a sphere inlet pipe assembly connected to an upper portion of the flow-limiting pipe; wherein the sphere inlet pipe assembly comprises several feed pipes, and sphere inlet holes of which the number is equal to that of the feed pipes are provided on the flow-limiting pipe; the sphere inlet holes are connected to the flow-guiding region; and each of the feed pipes is connected to each of the sphere inlet holes in a one-to-one correspondence respectively through feed pipe orifices.

10. The spherical object falling buffer device of claim 1, wherein the central column assembly further comprises a central column support connected to the top of the central column; wherein the central column support is connected to the flow-limiting pipe, and a shielding assembly is provided at the top of the flow-limiting pipe.

* * * * *